US010621635B2

(12) United States Patent
Vanguard

(10) Patent No.: US 10,621,635 B2
(45) Date of Patent: Apr. 14, 2020

(54) METHOD, SYSTEM AND COMPUTER PROGRAM PRODUCT FOR MAINTAINING SCARCITY OF INTELLECTUAL PROPERTY IN ONLINE COMMERCE

(71) Applicant: Arthur S Vanguard, Evanston, WY (US)

(72) Inventor: Arthur S Vanguard, Evanston, WY (US)

(*) Notice: Subject to any disclaimer, the term of this patent is extended or adjusted under 35 U.S.C. 154(b) by 340 days.

(21) Appl. No.: 14/278,725

(22) Filed: May 15, 2014

(65) Prior Publication Data

US 2015/0332358 A1   Nov. 19, 2015

Related U.S. Application Data

(60) Provisional application No. 61/823,859, filed on May 15, 2013.

(51) Int. Cl.
*G06Q 30/00* (2012.01)
*G06Q 30/06* (2012.01)
*G06Q 50/18* (2012.01)

(52) U.S. Cl.
CPC ........ *G06Q 30/06* (2013.01); *G06Q 30/0607* (2013.01); *G06Q 50/184* (2013.01)

(58) Field of Classification Search
CPC ...................................... G06Q 30/06
USPC ...................................... 705/26.1
See application file for complete search history.

(56) References Cited

U.S. PATENT DOCUMENTS

| | | | |
|---|---|---|---|
| 8,965,808 B1* | 2/2015 | Van Erlach | G06Q 50/184 705/59 |
| 2005/0075956 A1* | 4/2005 | Artis | G06Q 30/02 705/30 |
| 2011/0246275 A1* | 10/2011 | Mendez | G06Q 30/0222 705/14.23 |
| 2014/0222607 A1* | 8/2014 | Drouin | G06Q 30/0643 705/26.3 |

* cited by examiner

*Primary Examiner* — Mila Airapetian

(57) ABSTRACT

A method, computer program product and system are disclosed for limiting supply of electronically transmittable and transferable instances of intellectual property (such as for example works of authorship) and for trading, transferring, licensing and/or controlling of ownership and distribution of transferable instances of intellectual property.

22 Claims, 4 Drawing Sheets

METHOD, SYSTEM AND COMPUTER PROGRAM PRODUCT FOR MAINTAINING SCARCITY OF INTELLECTUAL PROPERTY IN ONLINE COMMERCE

PRIORITY CLAIM

This application incorporates and claims priority to U.S. Provisional Patent Application No. 61/823,859 for "A Method for Trading Limited in Supply Electronically Transferable Instances of Intellectual Property" filed on May 15, 2013 by Artur Sayecki.

BACKGROUND OF THE INVENTION

Field of the Invention

This invention relates to electronic trading of intellectual property, and more specifically to a method, system and computer program product for limiting supply of electronically transferable instances of works of intellectual property.

Description of the Related Art

Transactions on the Internet involve countless number of goods and services and various creative ways of trading, buying, selling, reselling, as well as exchanging them for valuable consideration such as for example: money, money equivalents, such as stocks bonds etc., and other goods or services, etc.

Original works of authorship, also called "works", and embodiments of said works in any reproducible medium of expression, also known as instances, have been a vivid subject of electronic commerce and particularly Internet commerce. Some works involved in electronic commerce include works protected under U.S. Code Title 17 copyright laws, and copyright laws of other counties, and particularly works fixated in a tangible medium of expression, from which they can be reproduced.

Digital copies of these works are sold across the Internet through a variety of retail websites and online trading platforms finding popular appeal such as iTunes®. Because digital copies of intellectual property are so easily reproduced, supply has outweighed demand.

There exists no means in the art of limiting supply and output levels with a view for maximizing profitability, or of forcing the market, to evaluate and determine the commercial viability of new artistic works which have yet to be marketed independently of the larger studios, publishing houses and record labels. A number of record stores have emerged in response to increased instances of digital intellectual property available online, but none seek to limit supply.

There are various types of works and various types of instances that may not be electronically transferable as well as various forms of electronic commerce suitable to each work, instance or group of works or instances. Whether a work or an instance is or isn't electronically transferable may influence the methods of electronic commerce applicable to the work.

For example, in some cases a work can be fixed in a medium of expression in such a way that it is inseparable from the medium in which it is expressed and the medium becomes an integral part of the instance and any alteration, separation or destruction of the medium may affect the artistic, esthetic or monetary value of the instance, for example a first and original oil painting, such as Harlequin Musician by Pablo Picasso, or Mona Lisa by Leonardo da Vinci. These are works instantiated in a medium in such a way that the medium becomes an integral part of the instance and uniquely contributes to the character and nature of the instance thus affecting its artistic and esthetic perception and monetary value. Such instances cannot be reproduced by any known technology in such a way that the reproduction is indistinguishable from the original instance.

In other cases an instance of a work may not be electronically transferable because such transfer is unlawful, even though it may be technologically possible. Some works are not electronically transferable because they are embodied or instantiated in a physical container, also called medium, wherein such embodiment or instantiation was meant to be transferred only with the physical container or medium. Many consumer entertainment products such as Compact Disk (CD) products, Digital Video Disk (DVD) products, audio tape products, video cassette products, etcetera, contain instances of works that are not electronically transferable, because the law expressly prohibits such electronic extraction, transfer, transmission, sales or distribution, without the original container.

Additionally, many such consumer products comprise more than one instantiated work, for example a graphic work, recording work, packaging work, producer's work, songwriter's work, composer's work, etc., wherein each work uniquely contributes to the value of the product and is meant to be sold and used together with the whole entertainment product and not electronically extracted by the consumer and then transferred, sold or distributed as separate electronically extracted piece, without the original container (medium). Furthermore such unauthorized or illegal removal, or extraction and electronic transfer, is often punishable under the law and sometimes technologically prevented by application of copy protection technologies.

There are however other ways of instantiation a work where a medium of expression does not substantially affect the artistic, esthetic or monetary value of the instance. For example an original digital sound recording can be stored on many different types of digital medium without affecting the artistic, esthetic or monetary value of each instance as long as all the types of medium used to instantiate the sound recording offer the same or substantially similar quality of perception or reproduction.

Moreover it is possible to create copies of such instance, where the copies, for all practical purposes, are indistinguishable or virtually indistinguishable from one another and from the original.

The instances of works that are a subject of commerce can be divided into two general categories:

Category I.

Instances of works that cannot be transferred electronically and therefore are not transferable over an electronic network such as for example: sculptures in bronze, in iron, in plaster, in clay, in wood, etcetera, paintings or drawings on fabric, on wood, on glass, on walls, on metal, etcetera, writing or engraving on paper, on stone, on metal, on wood on concrete, and the like, or other works embodied in, or made of physical substance or material that cannot be transferred electronically according to the current state of the art.

Some aspects of such not-electronically transferrable instances of works may be however transferred electronically with use of certain technological means; for example, while an oil painting with its canvas and paint matter may not be electronically transferable, an authorized digital photograph of said painting may be electronically transferable Other examples of not electronically transferable instances of works pertain to works embodied or instantiated in a physical container, also called medium, wherein the works are meant to be sold, transferred and distributed with that physical container (medium). Examples of such not electronically transferable instances are Compact Disk (CD) products, Digital Video Disk (DVD) products, audio tape products, video cassette products, and the like. It shall be noted that even if an instance of a work is not electronically transferable it may be possible in some cases to electronically transfer an ownership of said instance.

Category II.

Instances of works that can be transferred electronically in analog or digital form, wherein such transfer is technologically possible and lawful, include: audio-visual works either, pre-recorded, or otherwise embodied in an electronically readable medium, or transmitted live and simultaneously recorded or embodied in an electronically readable medium, for example: video, motion pictures, television programs, interviews, documentaries, news, audio-visual motivational programs, audiovisual kids entertainment, electronic video art, video of dramatic performances, video of pantomime performances, video footage of non-electronically-transferable-works, video footage of performance of non-electronically-transferable-works, and the like; audio and sound recordings either pre-recorded or otherwise embodied in an electronically readable medium, or transmitted live and simultaneously recorded or embodied in an electronically readable medium such as for example: sounds, songs in various genres, symphonies, sonatas, concertos, audio documentaries, radio programs, interviews, news, concert performances, news, audio-books, motivational materials, kids entertainment, audio-samples, electronic audio art, other sound recordings, sounds emitted by non-electronically-transferable-works, sounds of performance of nonelectronically-transferable-works, and the like; literary works embodied in an electronically readable medium, for example: books, articles, letters, literature, technical writings, editorials, testimonials, interviews, news, scientific writings, programmer's expressions of original ideas such as computer programs, catalogs, directories, images, pictorial and graphic works embodied in an electronically readable medium for example: photographs, electronic reproductions of paintings and drawings, electronic art, graphics, technical plans and drawings, architectural plans, reproductions, maps, charts, graphical works of applied art, and the like; other works recorded, stored or contained in a computer file, transmitted live and simultaneously recorded, or otherwise embodied in an electronically readable medium for example: computer graphics, computer animation works, data or other forms of programmer's expressions of original ideas, emails and electronic communications, interactive data, musical works including any accompanying words, dramatic works including any accompanying music, digitally altered video, digitally altered audio, digitally altered photographs, real time and delayed forms of original or derivative electronic art, real time or delayed text materials, images or other digital works, ringtones for cellular devices, copyrighted materials, text with graphics, works of electronic art, compilation works, collective works, joint works, transmitted and recorded aspects of non-electronically-transferable works, transmitted and recorded aspects of nonelectronically-transferable performances, narrated pictures, video with accompanying audio, animation video with audio, pictures with audio, computer graphics with audio etc.

Commercially viable works are often embodied in a medium. Some works are often embodied in multiple copies or are embodied in a single copy and then duplicated, replicated, reprinted, or otherwise copied or multiplied by creating multiple embodiments in a medium or mediums, wherein a single or multiple instances of said work may be embodied in one medium or various types of medium. Each occurrence of a work, stored, recorded, written, or otherwise embodied in any medium, from which it can be reproduced, shall be considered an instance of the work whether a single or multiple occurrences exist on, or in a single medium. For example if a medium such as computer readable hard disk contains 25 files, wherein each file has the same or essentially (substantially) the same content and such content is a work, than there are 25 instances of the work stored on this medium, even though such computer files may substantially differ as to their names, placement on a medium, format, size or bit resolution, etc., as long as they contain the same work, they are all instances of that work; another example: a re-writable optical disk that has two different tracks each containing the same work shall be considered as having two instances of said work, consequently ten of said compact disks each having two occurrences of the work shall be deemed to contain collectively 20 instances of the work, etc., (the counts of instances used in these examples are arbitrary and are used for illustrative purposes only, the actual number of instances on a medium may be higher, equal or lower than the count used in the examples).

In most cases, if an original instance is electronically transferrable then many of its copies or multiplied instances can relatively easily and inexpensively be made as almost indistinguishable or indistinguishable from the original. This is not true for instances of works that cannot be transferred electronically in which the original instance of work that is not electronically transferable is also distinguishable from its copies. In fact in most cases it is difficult and relatively expensive to make an indistinguishable or almost indistinguishable copy of such non-electronically transferable instance of work.

The ease of copying or otherwise multiplying of electronically transferable instances of works is one of the factors being frequently exploited by those involved in illegal exploitation of electronically transferable instances of works.

The situation is so wide spread that even some companies openly and illegally exploit electronically transferable works on a mass scale. The successful lawsuits against Napster, Kazaa etc., have underscored the illegality of unauthorized file swapping, and other offerings of copyrighted instances of works. And the losses of revenue due to electronic piracy are estimated in billions of dollars per year. According to estimates by RIM in 2003 music industry was losing $4.2 billion per year due to piracy. The report prepared in by IFPI estimates that in 2005 illegally downloaded songs in 10 major world markets amounted to 20 billion units. The electronic piracy and Internet piracy in particular are one of the most rampant ways of illegally exploiting instances of works. A legal exploitation of instances of electronically transferable works, involves various forms of retail sales or subscription. There are two main ways of conducting electronic commerce and legally exploiting electronically transferable instances of works.

One way of conducting electronic commerce in respect to electronically transferable instances of works can be described as a form of retail sales where a copyright owner or an authorized agent sells electronically transferable instances of works to consumers at a predetermined price per unit. Normally the consumers who purchased an instance of electronically transferable work such as for example: downloadable song, video, electronic book, and the like, are not allowed to sell it without a special permission. Such permission in most cases has to be obtained in writing and has to be negotiated on an individual basis with the owner of the copyrights or an authorized agent.

Another way of conducting electronic commerce with respect to electronically transferable instances of works can be described as a form of subscription where a copyright owner or an authorized agent offers to the consumer a subscription to a repository containing electronically transferable instances of works where the subscriber has certain rights, such as for example right to download or otherwise use in a predetermined way, electronically transferable instances of works, etcetera. Such predetermined ways comprise: downloading a predetermined number of instances within a time period, downloading unlimited number of instances within a subscription period, listening, playing or other forms of rendering of instances where the quantity of the rendered instances is either limited or unlimited within the subscription period, etcetera.

Currently, all the industry leaders involved in commerce of electronically transferable instances of music and video for example: iTunes, YouTube, Napster, Movielink, Rhapsody essentially practice either some form of retail sales or some form of subscription. In either case a consumer or subscriber is not permitted to resale the items that he purchased or subscribed to.

According to the US law, and laws of several other countries, owners of copyrights, at their own discretion, can create as many copies of instances of their works as they feel like. Even the so called "limited editions" of paintings or sculptures, etc. do not restrict the general ability of the copyright owner to make other copies of the original instance of work as long as they are somehow differentiated from the so called limited edition. Often such differentiation comes only as a different name or different form of packaging, or lack of consecutive numbering or signature of the creator, while the other essential aspects of a work being copied are often unchanged. The so called limited editions often have only limited enforceability under civil law or sometimes under the laws of false and misleading advertising and in many cases are not enforceable at all due to the fact that the contract between the buyer and the seller is often implied, rather than explicitly executed in writing.

The current legal ways of exploiting copies, or multiplied instances of some works are generally practiced with the intent of fully satisfying the market demand for such copies or multiplied instances. Reproductions of paintings, CDs, DVDs, audio tapes, video tapes, and the like are sold in the largest possible quantities and the copyright owners and their agents take pride in the quantities of units sold. There are even ratings and awards, which are highly regarded in the music and film industry, and are mainly based on quantity of units sold, for example: Billboard® charts for "Top CD sales" and "Top DVD sales, awards granted by Record Industry Association of America® (RIM) such as Gold® record. Platinum® record. MultiPlatinum® award, Diamond® award, Digital Gold™ award, are based on the numbers of units sold. This also applies to various other charts, classifications and awards granted by various organizations throughout the world.

The focus on selling maximum number of units may have impaired the industry's ability to exploit instances of works in other ways, namely trading on trading exchanges. In most cases trading of any units on a trading exchange is governed by rules of supply and demand and an increase in quantity of traded units usually adversely affects the value of an item being traded.

Another way of exploiting instances of works is practiced by auction houses. Many auction houses such as Bonhams, Christie's, Sotheby's, etc. have been well known to auction off original instances of works such as paintings, sculptures, etc. as well as copies of instances of works such as prints, reproductions, copies of sculptures, etc. Some online auction houses are also known to auction off digital downloads such as music or text files and in many cases, despite the auction house policies, such activities are illegal due to the fact that the material being auctioned off is offered without the permission or knowledge of the copyright owner. The legal auctions involving electronically transferable instances of works such as downloadable music, video, documents, etc., can be divided into four general categories:

I. Auctions of Items in Public Domain

Auctions of legally owned copyrighted material where such copyright is forfeited in the process of auctioning due to not affixing the copyright notices and providing the initially copyrighted material for unrestricted public use. Auctions of legally owned copyrighted material where the material is legally offered for sale but the buyer is not permitted to subsequently resale such material. Others, such as for example various combinations of the above, auctions with option to "buy now", etc. Even though, a bidding process occurring during an auction may be affected by the forces of supply and demand, the auctions function on different principles than trading exchanges, such as for example stock or commodity exchanges, etc. Items submitted for sale by an auction house are individually valuated on per-auction-basis involving condition, age, appraisal, previous ownership or other factors associated with each individual auctioned item. In contrast on a trading exchange, buyers are not bidding on an individual offering of a stock by a particular buyer but rather making a general offer to purchase a stock from any buyer who can meet their price and quantity requirements. This is particularly important on electronic exchanges where transactions are performed automatically as soon as the supply meets the demand and in most cases buyers do not know or care which seller supplied which item. No attention is being paid to the age, previous ownership or ware and tare of the shares of stock as all of them are considered to be directly interchangeable and are deemed to be of equal value as long as they belong to the same class. For example, on a stock exchange, a buyer wishing to purchase shares of stock of IBM generally doesn't care which seller supplies the shares as long as the price and quantity are favorable to the buyer. This is because all the units of IBM stock of the same class offered on a stock exchange are considered to be identical in quality and in most cases the buyer doesn't even know who the seller is. Another difference is that during an auction the auction house treats each auction separate and classifies the items offered at such auctions as clearly distinguishable from those offered at different auctions even if they happened to be identical in age, the and character. In contrast the trading exchange treats all the items of the same kind as identical in type and character without any distinction, other than the selling price, and classifies all of them under a common symbol such as, for example, IBM, which describes any and all shares of IBM common stock offered by any and all sellers and buyers trading on a trading exchange without regards to who offers them for sale, at what price or during which trading transaction. Yet another factor distinguishing the auction houses from trading exchanges is that the auction houses, and in particular electronic auction houses such as eBay, do not discern the scarce and non scarce items and in fact they offer a large quantity of items that are not scarce and generally available in retail stores and are offered them at a fixed and often very low prices and in quantities sufficient to saturate the market and fulfil fulfill the demand. In most cases the electronic auction houses make no guaranty whatsoever as to the scarcity or authenticity of the items being offered and the entire burden of making such a recognition is left to the buyer who therefore sometimes falls as a victim of unscrupulous sellers. In contrast trading exchanges have highly enforceable and secure trading systems offering for trade only certified, traceable and scarce issues of stocks or commodities by sellers that are certified or licensed to conduct such transactions and where such transactions are strictly enforced by the state and federal law and ensured by the trading exchange as to their accuracy, correct accounting and transparency. Yet additional factor associated with auctions is a need for constant advertising in order to inform the potential buyers about constantly changing items being offered. This factor limits the forces of supply and demand only to the people informed about the items being offered at any given time, and if the auction house, or an offering party, fails to adequately advertise then the balance of buyers and sellers may be severely disturbed and thus upset the real demand for this item. In contrast, if a trading exchange offers an new item for sale, such as for example shares of stock of a company, then in most cases, subsequently, such an item will be listed on the trading exchange and being continuously offered in substantially or entirely unchanged form, and therefore there is no need for subsequent advertising. A trading exchange may need to advertise only the first offering of an item sometimes called an "initial public offering" (IPO) and then subsequently refrain from advertising altogether without impacting the market valuation of the item. Even if the trading exchange or an offering party fails to adequately advertise the initial public offering of an item, any imbalance caused by such insufficient or excessive advertising is usually quickly corrected during the ongoing day-to-day trading.

As of the time of this writing and according to the best knowledge of the inventor, there is no trading exchange, system, outlet or method for trading or investing in instances of electronically transferable works in a manner similar to trading on a stock or commodity exchange. One of the reasons for this situation is the fact that there is no scarcity of instances of electronically transferable works because of the unrestricted, legally protected ability of the copyright owners to copy or otherwise multiply instances of works at their discretion. The low cost and ease of copying or otherwise multiplying electronically transferable instances of works and the potential for making copies that are indistinguishable from the originals, create the public perception of low or even null value of electronic instances of works. Furthermore there are no known and commonly practiced methods of establishing a balance of supply and demand of electronically transferable instances of works in a trading market. Another unresolved problem that inhibits establishing of trading exchanges of instances of works, is a fact that upon a sale of an electronically transferable instance of a work the new owner of said instance may illegally copy or multiply it, and then in turn flood the market with such copies and upset the balance of supply and demand and thus upset or even destroy altogether the entire trading system of electronically transferable instances of works. There are currently no issuers of instances of works with the purpose of trading said instances on a trading exchange or in a market where supply of such instances would be limited in quantity. And no person or entity currently allows the buyers to legally resale electronically transferable instances of works in an organized market such as for example trading exchange, etc. Also issuing legally or financially enforceable public statements about the acts of limiting quantity of instances of works are not being commonly practiced by the outlets selling electronically downloadable instances of works. Furthermore a predetermined, flat or fixed prices such as for example those adopted by iTunes and many others, at $0.99 per song, severely inhibit the mechanisms of supply and demand and are directly contrary to general concept of trading on a trading exchange. Subscription approach such as this practiced by Napster or Rhapsody is also contrary to market trading since no value is being attached to any individual electronically transferable instances of a work and even if such value was to be attached there are no mechanisms in place to reflect the changes of such value due to market forces exerted by trading.

All of the above described methods of selling, auctioning and swapping are to various degree incompatible or purely inadequate to establish a trading exchange of electronically transferable instances of works in a manner similar to this practiced by New York Stock Exchange, Chicago Mercantile Exchange, Chicago Board of Options Exchange, etc. None of the above described methods allow to limit supply or create scarcity of electronically transferable instances of works in a manner that is trustworthy, reliable, enforceable, transparent to the interested parties, and employable by a trading exchange.

SUMMARY OF THE INVENTION

From the foregoing discussion, it should be apparent that a need exists for a method, system and computer program product for maintaining scarcity of intellectual property in online commerce.

The present invention has been developed in response to the present state of the art; and, in particular, in response to the problems and needs in the art that have not yet been fully solved by currently available methods, systems and apparatus; and to overcome many or all of the above-discussed shortcomings in the art. Accordingly, the present invention has been developed to provide a method, system and computer program product for maintaining scarcity of intellectual property in online commerce.

Thus, the present invention solves the aforementioned problems.

Other benefits of the present invention are also described throuzhout the specification herein.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
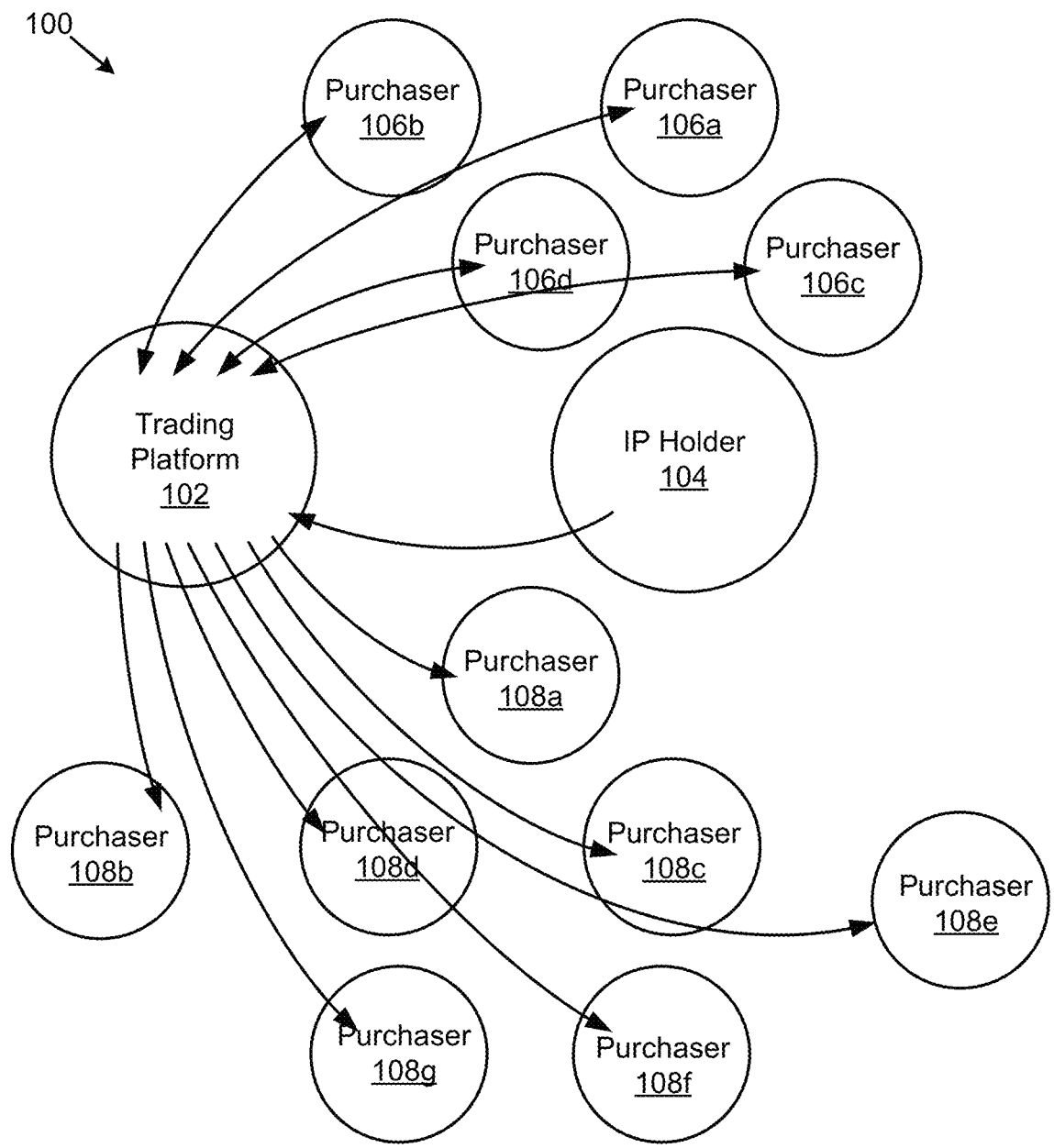
FIG. 1 is a simplified diagrammatic illustration of the flow and aggregation of instances between entities participating in a system for maintaining scarcity of instances of works in accordance with the present invention.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. The apparatus modules recited in the claims may be configured to impart the recited functionality to the apparatus.

The present invention provides an environment for responsible trading of electronically transferable instances of works and may help alleviate or reduce piracy by providing economic motivation to traders, users, investors and owners of electronically-transferable instances of works to protect the instances in their custody from illegal copying or multiplying and thus protect their trading value by avoiding undesirable dilution. The present invention may also be used to spur and motivate creativity through providing new ways of capitalizing on works and thus providing economic means beneficial to creators, owners and beneficiaries of intellectual properties and to society in general.

The present invention provides for trading electronically transferable instances of works wherein such trading may be performed on a trading exchange or in any other market governed by supply and demand. Herein introduced methods of limiting supply or creating scarcity of instances or other items that were previously thought unlimited, are critical for enabling forces of supply and demand that allow for existence of trading exchanges and enable free market trading of those instances or items.

Exemplary embodiments of the present invention will be taught herein. It shall be understood that these embodiments are not meant or in any way intended to limit the invention. The invention is intended to cover equivalents, alternatives and modifications, which may be included within the scope and spirit of the invention as defined by the claims herein.

In the following description of the invention, numerous specific details are presented and explained to provide a thorough understanding of embodiments. However, the present invention may be practiced without these specific details which will be obvious and apparent to those skilled in the relevant art. Additionally, some components, methods, circuits and procedures, which are well-known to those skilled in the relevant art, have not been described in details as they could unnecessarily obscure important aspects of this invention or adversely affect the clarity of the description. Furthermore it will be also obvious to one of ordinary skill in the art that certain parts, components or steps or elements of the invention may be modified, changed, combined or further divided without departing from the scope and spirit of this invention. It is therefore intended that such changes and modifications, combinations and subdivisions be covered under the scope of appended claims.

Roman numerals, numbers, alphabetic characters, and other identifying symbols used herein for convenience of explanations only, and should by no means be regarded as prescribing or imposing any particular order on the steps of any method.

The description of the present invention and explanations contained herein are presented in light of currently accepted business models, technological theories and practices. Such models, theories and practices are subject to revisions, updates and sometimes radical changes over time which may bring forth alternative realizations or actualizations of the embodiments described herein without affecting the scope and spirit of present invention, and thus such realizations or actualizations shall be treated as equivalents.

Terminology

The terms: transform, transformed, transforming, as used in claims, are to be given their ordinary and accustomed meaning.

The phrase "and/or," as used herein, should be understood to mean "either or both" of the elements so conjoined.

Singular and Plural Forms.

As used herein an "s" in parenthesis such as "(s)" appended to the end of any word means "one or more" of the element described by that word whether the subsequent verbs or modifiers are singular or plural. For example wheel(s) shall mean at least one wheel; instance(s) shall mean at least one instance; work(s) shall mean at least one work, etc. Additionally other words or phrases such as for example "a element" or "an element", etc., may also be used herein, to describe that "one or more" elements may be used or that "at least one element" is meant, etc.

Original work of authorship, also called "work" will be herein referred to as "original work of authorship" or "work of authorship" or "work". An embodiment of said original work of authorship in any medium of expression, now known or later developed, from which it can be perceived, reproduced or rendered, will be herein referred to as an "instance of the work" or "instance."

An "electronically transferable instance of a work" as used herein means an instance of a work of authorship that can be electronically transmitted from a first location to a second location, and stored at the second location.

Local Area Network will be referred to as "LAN". A Wide Area Network will be referred to as "WAN". A Read Only Memory will be referred to as "ROM", A Random Access Memory will be referred to as "RAM". An Erasable Programmable Read Only Memory will be referred to as "EPROM". An Electronically; Erasable Programmable Read Only memory will be referred to as "EEPROM".

FIG. 1 is a simplified diagrammatic illustration of the flow and aggregation of instances between entities participating in a system for maintaining scarcity of instances of works in accordance with the present invention. The system 100 comprises a trading platform 102, an IP holder 104, a purchaser 106a, a purchaser 106b, a purchaser 106c, a purchaser 106d, a purchaser 108a, a purchaser 108b, a purchaser 108c, a purchaser 108d, a purchaser 108e, a purchaser 108f, and a purchaser 108g.

The trading platform 102, in some embodiments, comprises a computer program in firmware or persistent computer readable storage running on one or more data processing devices (DPDs), such as a server, computer workstation, router, mainframe computer, smart phone, or the like. In various embodiments, the DPD comprises one or more processors. The processor is a computing device well-known to those in the art and may include an application-specific integrated circuit ("ASIC").

In some embodiments, the trading platform 102 interfaces with purchasers 106-108 vis-à-vis an interactive website on the Internet. The trading platform 102 is configured to automatically process payments for its purchasers 106-108, and other users, using means well-known to those of skill in the art, including PayPal®, credit card credits, direct bank deposits, and the like. In addition to interfacing via the website, the trading platform 102 may interact electronically with one or more IP Holders 104 using variations of the Simple Mail Transfer Protocol (SMTP), Internet Message Access Protocol (IMAP), Post Office Protocol (POP), or other protocols well-known to those of skill in the art.

The purchasers 106-108 may comprise any person, company or organization that is potentially a purchaser of a digital work. The purchasers 106-108 may purchase one or more instances of works (e.g. digital media products).

Artists or intellectual property (IP) holders 104 may be IP owners or others having usage rights to IP traded on the trading platform 102, in some embodiments, must create a virtual account with a website or trading platform 102 prior to uploading a digital instance of a copyrighted or trademarked work (or other instances). The virtual account may comprise personal information about the IP holder 104. The contact information may include one or more of: age, address, gender, telephone number, fields of artistic interests, income, and the like. In typical embodiments, the contact information is stored in computer readable memory, or emailed to the trading platform 102 using programs well-known to those of skill in the art, such Microsoft Outlook, Thunderbird, Yahoo! Mail, and the like.

The purchasers 106-108 may also comprise individuals and/or organizations who have registered or created virtual accounts with the trading platform 102 and/or who have purchased a digital work.

The digital work, or instance, may be uploaded by an IP holder 104. In some embodiments, the instance is mailed to the endorser on a physical medium, such as CD, DVD, cassette or the like. The digital work or instance may comprise any digital media or multimedia product capable of being stored in computer readable persistent memory, including music, video, audio, images, and text, including formats from the group comprising MPG, MP3, MP4, WAV, PDF, WORD, DOC, WPD, Flash®, and the like. Examples of digital works, or instances, further include music compositions (including rock, country, opera, religious, classical), video (documentaries, fictional, etc), text (novels, biographies, autobiographies, scripts, plays, text books, picture books, children's books, etc), and images (clipart, journalistic, familiar, etc), or any combination of the above.

The arrows in FIG. 1 show the flow of money from the purchasers 106a-d to the trading platform 102 to purchasers 108a-g. This money flows, to the purchasers 106, 108 of an instance. In various embodiments, the purchasers 106 resell the purchased instances back to the trading platform 102.

As shown, purchasers 106a-d send funds to the trading platform 102 when instances of works are purchased and/or downloaded, or when instances of works are purchased and sent on CD, DVD and the like to the purchasers via US Postal Service, Federal Express, DHL, UPS, and the like.

In some embodiments of the present invention, a tangible product may be substituted in place of an instance of works. Thus, in some embodiments, a vacuum cleaner might be sent to an endorser for a rating instead of a DVD and the like. In some embodiments of the present invention, purchasers whose endorsements have proven economically more viable, or more predicative of future sales, might receive random products for their endorsement, from couches to CDs, to DVDs, with permanent ownership of such products conveyed to the endorser upon the endorser providing a rating of said product.

In some embodiments, a DPD may be configured with software or firmware to track the shipping status of tangible products to endorser(s) using tracking numbers, including by passing such tracking numbers as parameters to websites or APIs maintained by UPS, the US Postal Service, Federal Express, and the like.

One way of conducting electronic commerce in respect to electronically transferable instances of works can be described as a form of retail sales where a copyright owner or an authorized agent sells electronically transferable instances of works to consumers at a predetermined price per unit. Normally the consumers who purchased an instance of electronically transferable work such as for example: downloadable song, video, electronic books, are not allowed to sell it without a special permission. Such permission in most cases has to be obtained in writing and has to be negotiated on an individual basis with the owner of the copyrights or an authorized agent.

In various embodiments of the present invention, electronically transferable instances of works can be described as a form of subscription where a copyright owner or an authorized agent offers to the consumer a subscription to a repository containing electronically transferable instances of works where the subscriber has certain limited rights including the right to download a predetermined number of instances within a set time period, listening, playing or other forms of rendering of instances where the quantity of the rendered instances is either limited or unlimited within the subscription period, and the like.

It shall be understood that any embodiment of a work in any medium from which it can be perceived, read, expressed or reproduced, represents an instance of the work, no matter if such embodiment is stable, transitory or ephemeral in nature and no matter if the medium is matter, energy or a combination of both. For example a work can be instantiated (recorded) on a magnetic medium, in form of a magnetic pattern embodied in a ferromagnetic material, then such magnetic pattern can be read by a computer and transmitted from one location to another over a wire in form of electrical pulses; transmitted as an electromagnetic wave through air; converted to light and transmitted by a fiber optic cable; and the like. No matter what is the form or medium of the transmission, the electronic signal, whether electric, magnetic, electromagnetic, optical, or other, etcetera, can carry exactly the same digital or analog information and such information (content) can be transmitted bit-by-bit or by waves, from a first location to a second location and can be simultaneously, or sequentially reproduced, rendered, performed or stored as an instance for later reproduction.

When an instance is transmitted from a first location to a second location and subsequently stored at the second location while maintaining an instance at the first location, then other that the fact that the two instances reside at different physical locations, they may be substantially similar or even possibly indistinguishable from each other. Furthermore it is possible that the information (the content) of an instance can be partially received from the electromagnetic transmission through air and partially received from the optical transmission through fiber optic cable, or any another type of transmission, and it is often impossible to tell which part of the information comprised by the instance was received by what manner of transmission, in what way and by what means.

Figure 2:
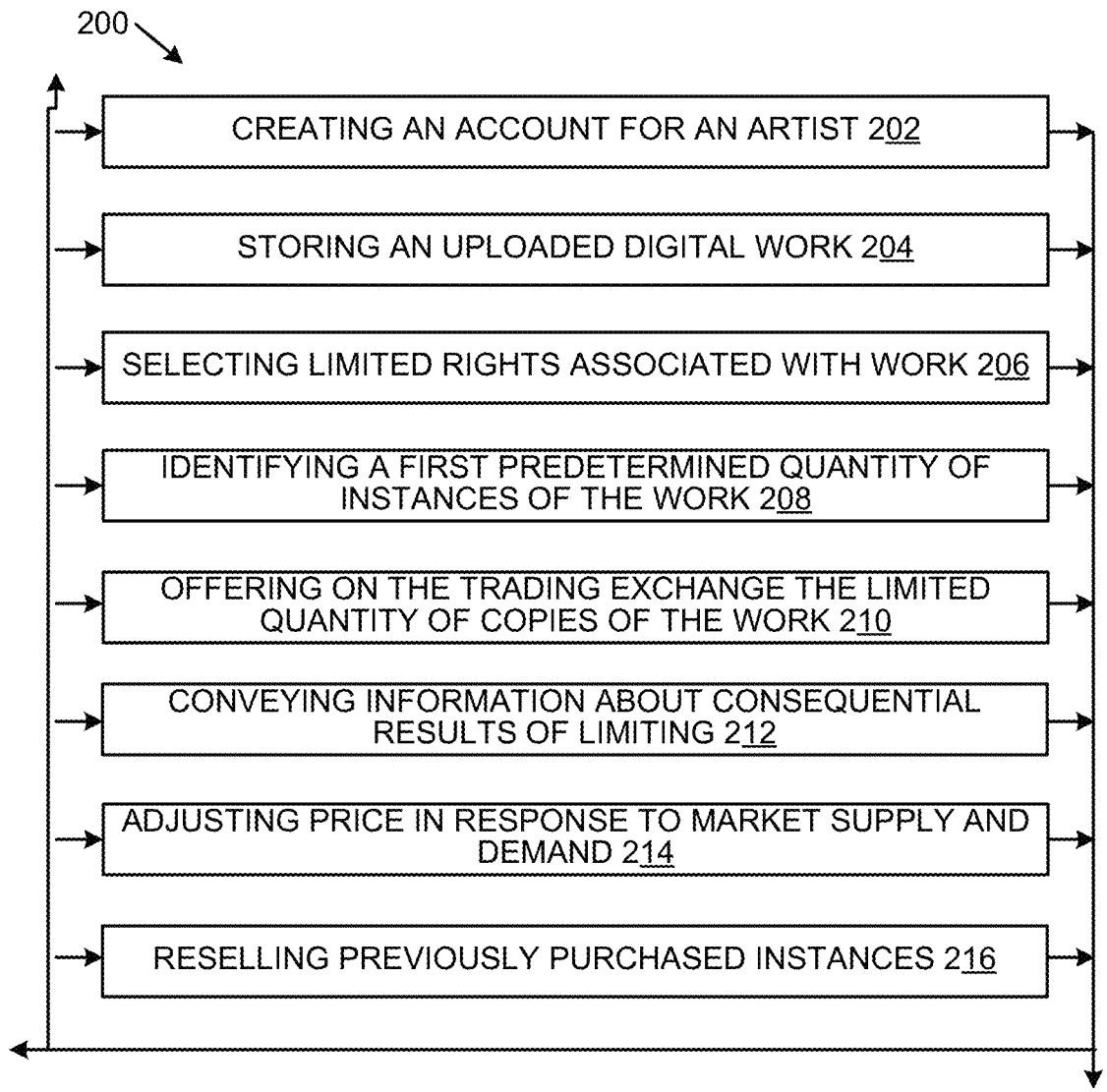
FIG. 2 is a process flow chart of a method of maintaining scarcity of instances of works in accordance with the present invention.

FIG. 2 is an exemplary process flow chart of a method 200 of maintaining scarcity of an instance of works in accordance with the present invention. The method 200 begins 202 when a virtual account is created via a website. The account may comprise personal identifying information of the IP Holder 104, or an organization with which the IP Holder 104 is affiliated, such as a corporate entity. Various embodiments of the method 200 are described below.

The present invention can be practiced as computer implemented and human assisted. The present invention can be effectively practiced over a communication network such as for example the Internet, LAN, WAN, etc., wherein for example: trading of electronically transferable instances of works and communication between parties, etc. could be effectively carried on. A human assistance may be beneficial in respect to entering data, maintaining software, verifying compliance with governing laws, etc. An additional human assistance may be used in form of human-to-human communications that may facilitate reaching agreements as to the terms of limiting, approving, negotiating or closing certain transactions. Such a human-to-human communications can be practiced over a communication network such as for example the Internet, LAN, WAN, phone network, wireless transmissions, etc.; or through a mail delivery system such as United States Post Office, United Parcel Service, Federal Express, etc.; in person, through personal conversation; etc. Said human to human communications may be also used to make a disclosure about the limiting or to disseminate or convey information to an interested party or parties, etc.

Other aspects of practicing the invention involve a computer implementation, and particularly running (executing) one or more computer programs on one or more computers, to perform collectively or individually steps of the methods claimed and described herein. The computer(s) can be used in a network environment wherein the implementation has provisions for a computer input and output comprising, machine readable input/output and human input and humanly readable output; and wherein the human input can affect at least one element of the computer implementation such as for example: execution of a computer program, data, formulas, etc., and cause a consequential result which is dependent on the human input. Said provisions would allow humans to enter the necessary data, make changes to existing data, or give instructions to one or more computers in order to achieve a consequential result.

It shall be obvious to one skilled in the art that some steps of the methods described herein can be performed concurrently or in a different order, for example the step of exercising right(s) to limit a quantity of electronically transferable instances of works, and the step of limiting quantity of electronically transferable instances of works, and the step of informing (conveying information) may be performed concurrently or may be practiced together by performing one act having multiple purposes, however no matter how combined or practiced together if such steps produce a results accordant with the present invention they shall be covered by the claims stated herein. It shall be obvious to one skilled in the art that the steps of the methods described herein may be implemented with a varying degree of human assistance and may optionally be performed entirely by humans or entirely by computer(s). Additionally at least a part of the data resulting from performing any method herein as well as instructions to perform any method herein, such as for example: computer executable instructions, human readable instructions, a computer program, etc., may be stored on a computer readable medium for example: a hard disk, optical disk, floppy disk, Bernoulli disk, memory stick, EPROM, RAM, etc.

Additionally some of the results of practicing any method described herein may be represented in a humanly readable format such as for example a humanly readable text displayed on a display monitor, printed, hand written etc.; audible human speech generated by a computer, generated by an electronic device, spoken by a human, etc.; displayed or embodied in a humanly readable code such as for example communicated through a sign language, Brail alphabet, Morse code, etc.; or any other humanly readable format.

Alternative modes of implementations are described herein in this document in respect to the presented embodiments.

The present invention provides an environment for responsible trading of electronically transferable instances of works and may help alleviate or reduce piracy by providing economic motivation to traders, users, investors and owners of electronically-transferable-instances-of-works to protect the instances in their custody from illegal copying or multiplying and thus protect their trading value by avoiding undesirable dilution. The present invention may also be used to spur and motivate creativity through providing new ways of capitalizing on works and thus providing economic means beneficial to creators, owners and beneficiaries of intellectual properties and to society in general.

The present invention is substantially transparent to the users, thus allowing a new market sector to emerge wherein such market will be dedicated to trading, exchanging and exploiting instances of works and in particular electronically transferable instances of works. Furthermore, the present invention provides for trading electronically transferable instances of works wherein such trading may be performed on a trading exchange or in any other market governed by supply and demand.

In some embodiments of the present invention, an owner of a work or an authorized party, having a legal authority to limit a quantity of instances of the work, exercises at least one legal right to limit a quantity of an electronically-transferable-instances of the work. The right(s) to limit the quantity of the electronically transferable instances of the work are exercised using at least a one agreement or at least a one declaration, or at least one agreement together with at least one declaration. Wherein said agreement(s) and/or declaration(s) are legally or financially, or legally and financially enforceable, and obligate at least one executing party legally, or financially, or legally and financially to perform as agreed and/or declared and limit the quantity of the electronically transferable instances of the work according to at least at a one provision and/or at least one statement in said agreement(s) and/or declaration(s).

A party that intends to limit the quantity of instances of the work has to have at least one legal right to do so and at least one such legal right has to be exercised, otherwise the act of limiting is legally invalid or altogether illegal. Other ways of exercising the right(s) to limit the quantity of the electronically transferable instances of the work can also be used, such as for example: a one or more of the following: a verbal or a written statement, a court order, an affidavit, a promissory note, a private or public statement, a proclamation, etc. While in this embodiment of the invention the exercising of the right(s) to limit the quantity of the electronically transferable instances of the work is performed in such a way that it is legally or financially enforceable and obligates to perform at least one executing party, in an alternative embodiments of the invention the exercising of the right(s) to limit the quantity of electronically transferable instances of the work may be not-enforceable legally, nor financially; for example a verbal agreement made in a social group may be morally or socially obligating and possibly socially enforced by pressure and accountability to the peers in the social group, but may not necessarily be legally or financially enforceable; another example: a promise made to a party or a social group may be morally or emotionally obligating but not enforceable at all, etc.

Furthermore other expressed or implied ways of exercising the right(s) can also be practiced in alternative embodiments of the invention. An action of physical limiting of electronically transferable instances of the work performed by an authorized party, such as for example deleting a quantity of electronically transferable instances of the work from a computer-disk, etc, is also a form of exercising the right(s) to limit electronically transferable instances of the work even though, no verbal nor written assertion of the right(s) have been made, etc. In addition, the agreement or declaration may additionally specify: a party that will be legally and/or financially responsible for performing the limiting, results of the limiting, maintaining a limit resulting from the limiting, enforcing a limit resulting from the limiting, etc. Additionally in an alternative embodiment of the invention any combination of single or multiple agreements and/or declarations may also be used either concurrently or subsequently.

In this embodiment of the invention the legal agreement(s) and/or declaration(s) is(are) used to exercise the right(s) to limit quantity of electronically transferable instances of the work. An exemplary legal agreement and an exemplary declaration is described herein below, however it shall be appreciated that any other type or format of an agreement and/or declaration may be used so long as it accomplishes the goal of limiting the quantity of electronically transferable instances of the work. An exemplary agreement for limiting quantity of electronically transferable instances of the work can be executed by one or more of the following exemplary ways: in person by signing the agreement; by verbally agreeing to the terms of the agreement; by agreeing through an authorized agent or representative legally authorized to execute an agreement; by agreeing to the terms of an electronic document and/or agreement transmitted over a communication network such as for example Internet, etc.; by executing a computer program authorized to execute or acknowledge an agreement; by obeying a court order or ruling compelling one to accept an agreement; by obeying a law requiring one to accept an agreement or by any other way an agreement can be executed and/or entered into; etc.

One skilled in the art may also apply other methods. In addition to limiting quantity of electronically transferable instances of the work, the agreement(s) and/or the declaration(s) may also specify a one or more usage right associated with each electronically transferable instance of the work or group of electronically transferable instances of the work, for example: a conditional right to resale, an unlimited right to re-sale, a right to execute, a right to copy, a right to read, a right to print, a right to electronically transfer, a right to display, or any other right to render, transfer, transmit, use or otherwise exploit, etc.

In one embodiment of the invention the usage right(s) are enforced using a Digital Rights Management (DRM) system however the usage right(s) can also be enforced in other ways such as for example by: a civil action, a criminal action, a self imposed action or conduct, a governing law, a court order, a human security agents, an electronic means such as for example: a computer under a control of a software, an electronic hardware such as for example: dongle or an electronic key, etc., or by any other one or more method such as for example: legal method, social method, technological method as well as anyone or more apparatus, or technology, or a combination of anyone or more method and anyone or more apparatus.

In another embodiment of the invention terms of the agreement may also comprise for example a specifying a one or more trading restrictions, a one or more trading privileges, a dynamically changing quantity of the electronically transferable instance of the work based on a consequential event or a factor or a formula for static or dynamic or consequential limiting, a grant of voting right, an entitlement to a royalty, etc., and any other matter that may be relevant to the work and/or to the instances of said work and in particular to the electronically transferable instances of said work, as well as matters that are not directly related to the work but may be considered important to the execution or implementation of the agreement, etc.

Furthermore the agreement can also specify a dynamically changing quantity of electronically transferable instance of the work based on a consequential event or a factor or a formula for a static, dynamic or consequential limiting, for example the limiting party may prescribe that the quantity of electronically transferable instance of the work should change by a fixed amount based on a consequential event, or should change dynamically according to a formula that is factoring a consequential event such as for example: a war, a status of sound recording market, a weather, or any other event or combination of events that may affect a trading market, etc.

In the exemplary agreement the first party(s) is a person(s) or an entity(s) having a legal authority to limit quantity of the instance(s) of the work while the second party is an exchange that intends to trade the instance(s) of the work. It shall be however appreciated that the agreement could be unilateral or executed by any two or more parties, wherein neither one is a trading exchange, so long as at least one party has the legal authority to limit the quantity of instance(s) of a work and execute the agreement. For example such an agreement could be executed between the person or entity having the legal authority to limit the quantity of instances of the work and a one or more traders interested in buying the instance(s) of the work; or between the person or entity that has the legal authority to limit the quantity of instances of the work and a person and/or company acting as an agent, intermediary and/or broker of the instances being the subject of limiting, or between the person or entity having the legal authority to limit the quantity of instances of the work and at another person and/or company willing to participate as a party to such an agreement; etc.

The agreement can also be executed unilaterally by the person or entity having the legal authority to limit the quantity of instances of the work to the benefit of any other party or parties, etc. In the exemplary agreement a type and a quantity of instances of the work are specified. The limit of quantity of the electronically transferable instance(s) of the work can be set based on certain factors or criteria, can be conditional, graduated, incremental, based on events, can be fixed or set to a predetermined number, etc., or can be entirely arbitrary and decided at the discretion of an authorized party. However it shall be understood that such an agreement can be made without specifying neither type nor quantity of instances of a work or without naming a work but only implying them. For example the agreement can state that a creator or an owner of a work will limit some or all instances of his/her work or works, that will be created or owned in the future by this creator or owner, wherein such limit of quantity may be also decided in the future or may be subject to certain factors, forces or conditions, either currently known or existing in the future, etc.

An exemplary declaration for limiting quantity of electronically transferable instances of a work is described below. In an exemplary declaration a party having a legal authority to limit quantity of instance(s) of a work declares and/or discloses that he/she/it already has limited or will limit the quantity of instances of at least one work, wherein said work is existing now or one that will be created in the future. Such a declaration whether written, verbal or in any other form such as for example electronic document and/or website accessible over the Internet, a statement to press or media, a public statement, a court statement, a civil declaration, or declaration in any other form is announced and/or disclosed to the interested party or parties. The exemplary declaration for limiting quantity of electronically transferable instances of a work is made as to be legally binding but in other embodiments of the invention other forms of declaration may be practiced such as for example a declaration which morally obligates the promissor to perform as promised, but is not legally binding, etc., for example giving ones' word or making a promise are forms of declarations that in some cases may be non-binding legally. Many types of not legally binding declarations, such as for example giving ones word and/or making promise are still practiced today as a way of doing business and may be considered as viable and usable ways of limiting the quantity of instances of a work.

In the exemplary declaration the type and quantity of instances of a work are specified. A name or title of a work can also be specified. The limit of quantity of electronically transferable instances of a work can be set based on certain factors or criteria, can be conditional, graduated, incremental, based on events, can be fixed or set to a predetermined number, and the like; or can be entirely arbitrary and decided at the discretion of an authorized party. However it shall be understood that such a declaration can be made without specifying either type, or quantity of instances of a work, or without naming a work but only implying them. For example a declaration can state that a creator or an owner of a work will limit some or all instances of his/her work or works that will be created or owned in the future by this creator or owner, wherein such limit of quantity may be also decided in the future or may be subject to certain factors, forces or conditions, either currently known or existing in the future, etc.

In addition to limiting quantity of instances of a work, a declaration may also specify the usage right(s) or rights associated with each electronically transferable instance of a work or group of electronically transferable instances of a work, for example: conditional right to re-sale, unlimited right to re-sale, right to execute, right to copy, right to read, right to print, right to electronically transfer, right to display, or any other right to render, transfer, transmit, use or otherwise exploit, etc. A declaration may also specify trading privileges or restrictions, dynamically changing quantity of electronically transferable instance of a work based on consequential events or factors, formulas for static, dynamic or consequential limiting of voting rights, royalties, etc., and any other matters related to a work, instances of said work or electronically transferable instances of said work, as well as matters that are not related but are considered important to the execution or implementation of the declaration, and the like. Furthermore a declaration can also specify a dynamically changing quantity of electronically transferable instance of a work based on consequential events or factors or formulas for static, dynamic or consequential limiting, for example the limiting party may prescribe that the quantity of electronically transferable instance of a work should change by a fixed amount based on a consequential event, or should change dynamically according to a formula that is factoring consequential events such as for example: a war, status of sound recording market, weather, or any other event or events that may affect the trading market, etc.

Exercising of the right(s) to limit quantity of electronically transferable instances of a work takes place and the step of exercising the rights to limit quantity of electronically transferable instances of a work have been accomplished.

In this embodiment of the invention the limiting of quantity of electronically transferable instances of the work can be performed at any time either sequentially or concurrently with the exercising of right(s) to limit quantity of electronically transferable instances of the work so long as said limiting doesn't infringe on the right(s) to limit quantity electronically transferable instances of the work nor interfere with exercising the right(s) to limit quantity of electronically transferable instances of the work. It shall be appreciated that a limiting not supported by exercising the necessary right(s) to limit quantity of electronically transferable instances of a work, or in other words a limiting of electronically transferable instances of a work without the right(s) to do so, is illegal or legally invalid even though it may be physically possible and effective. However, if the party performing the limiting has the legal right to limit the quantity of instances of a work but is unaware of it, he/she/it still may be able to effectively limit quantity of instances of the work and exercise his/her/its legal right(s) unknowingly and such limiting action can be valid and in some cases may also be legally and/or financially enforceable by the interested parties.

In this embodiment of the invention the limiting is performed, and a resulting limit of quantity is enforced, with one or more computers executing a software instructions to perform a one or more of tasks comprising: creating a one or more new electronically transferable instances of the work and thus a new pool of electronically transferable instances of the work, or deleting, adding, maintaining constant, a number of instances in the existing pool of electronically transferable instances of the work, etc. The computer(s) performing the limiting may be a stand alone or a computer connected to a communication network such as for example: LAN, WAN, Internet, wireless network etc.

Furthermore the limiting can be performed locally or from a distance, over the communication network, or can be distributed wherein a part of the limiting is performed at one location and another part takes place at a different location or locations, etc. In this embodiment of the invention the limit can be fixed and set to a predetermined number or dynamically changing and based on a one or more consequential event, factor, or formula, for example the limiting party may prescribe that the limit of quantity of electronically transferable instances of a work should change by a fixed amount based on a consequential event, etc.

In yet additional example the limiting party may prescribe that the limit of quantity of electronically transferable instances of a work should change dynamically according to a formula that is factoring a consequential event such as for example: a war, status of sound recording market, weather, or any other event or events that may affect a trading market, etc. The limit of quantity of electronically transferable instances of the work can also be set to a fixed number wherein such number is greater or equal to 1 (one). In alternative embodiments of the invention the limit of quantity of electronically transferable instances of a work is set to a fractional number. It is possible to divide an electronically transferable instance of a work into parts and sell or trade such parts individually. In such a case the limit could be a fractional number which can be smaller, equal or greater than 1 (one) so long as such fractional number is practical and useful such as for example selling or trading a portion of an instance of a work for a use in a production of a commercial advertisement or any other useful application.

In another embodiment of the invention a limiting is performed, and a resulting limit of quantity is enforced, by using a rights management (RM) system, wherein the quantity of electronically transferable instances of a work is maintained, enforced or altered according to a predetermined or dynamically changing rules and wherein certain consequential rights can be exercised by users according to a predetermined or dynamically changing rules. In some embodiments of the invention a rights management system such as for example a DRM, etc., can be used to enforce other right(s) and/or functions such as for example manage anyone or more of the following: quantity of electronically transferable instance(s) of a work in circulation, transferring, access, rendering, replication, copying, deleting, maintaining, buying, selling, reselling, exchanging, trading, rendering, consuming, etc. However other rights management systems and other methods and devices for managing the right(s) can also be used for example: password protected access, an encryption/decryption process such as a symmetrical encryption with a single key, or asymmetrical encryption with a public and private keys, etc., or electronic enforcement such as by dongle or electronic key, other electronic device or circuit, etc. The limit of quantity can also be enforced by yet other rights management systems for example: a legal RM system, social RM system, mechanical RM system, etc. An example of such yet other RM system is a legal RM system where a law enforcement officer(s) enforce a law prohibiting illegal multiplication or copying of instances of a work.

Another example of yet other RM system is a social RM system where a members of a social group practice certain rules and perform in accordance with those rules due to a social, moral, legal, emotion, etc., pressure exerted by other members of the group. In such a group the members of the group that are equipped with a computer or another electronic device capable of limiting quantity electronically transferable instances of a work, could create, destroy, add, maintain, account, track, refrain from taking or take an action involving creation, manipulation, use, etc of electronically transferable instances of a work according to a certain rules prescribed by the social group. A rights management system can also be used in conjunction with other methods of limiting electronically transferable instances of a work.

Additionally one or more results of the limiting such as for example: limit of quantity, formula for limiting, properties of electronically transferable instances of a work, etc, may be stored on a computer readable medium such as for example: a magnetic disk, optical disk, memory stick, and the like. Also the limited in quantity electronically transferable instances of a work may also be stored on a computer readable medium.

In yet other embodiments of the invention a limiting is performed and a resulting limit of quantity is enforced electronically for example: by adding, copying or otherwise multiplying, replicating, destroying, deleting, erasing, maintaining, tracking, creating, electronically transferable instances of a work as needed to achieve the desired quantity limit.

The limiting can be performed using one or more computing device for example: computer, Personal Digital Assistant (PDA), wireless computing device, server, portable media player, etc. The limiting can also be accomplished by one or more electronic apparatus, such as for example: magnetic medium recorder or eraser, reel to reel tape recorder, digital audio tape recorder, cellular phone, etc. At least one result of the limiting, for example: a limit of quantity, a formula for limiting, a subject of limiting such as for example: name, type or a particular specimen of electronically transferable instances of a work, properties of the subject, etc. may be stored on a computer readable medium such as for example: a magnetic disk, optical disk, memory stick, ROM, RAM, EEPROM, EPROM, etc.

In yet additional embodiments of the invention, a non-electronic ways of limiting and enforcing a limit may be used such as for example: mechanical, magnetic, radio-active, pneumatic, hydraulic, chemical, optical, electric, manual, etc., for example exposing an electronic medium, such as magnetic or optical medium, to sunlight, heat, radio-active radiation, corrosive acid, mechanical force, pneumatic or hydraulic pressure, electromagnetic field or laser light may result in physical destruction of the electronic medium and thus limit quantity of electronically transferable instances of a work stored on said medium.

In this embodiment of the invention the limiting of electronically transferable instances of a work is performed to cause a limited supply of electronically transferable, instances of the work in at least one trading market. It is possible to limit the supply of electronically transferable instances of a work in one trading market while having not-limited supply of electronically transferable instances of the work in other markets, for example a supply of electronically transferable instances of a work can be limited in one or more geographical region, country or continent, but not-limited in other geographical region or regions, etc. Furthermore, the supply of electronically transferable instances of a work can be limited in one or more trading market while being not-limited in one or more retail markets, or one or more swapping markets, etc. For example the supply of electronically transferable instances of a work can be limited for trading on one or more trading exchange(s) but be unlimited for retail selling through an online store(s), etc. A local or selective limiting in only some markets may in some cases be less effective and some parties may be prone to making evasive transactions or actions meant to avoid limited supply in one market and obtain the same item in another market, or from another sources with a not-limited supply and at lower prices, or free of charge.

Moreover some individuals or entities could potentially engage in transferring tradable items between trading exchanges in several different criminal or civil jurisdictions to avoid or bypass the laws that may protect the local limiting of supply. Illegal activities such as for example smuggling, etc., could also arise. Whenever legally possible and feasible the supply can be limited in all the markets or for all uses, and thus making electronically transferable instances of a work scarce on a global scale.

In an alternate embodiment of the invention a limiting can be performed by creating electronically, or otherwise, a finite quantity of electronically transferable instances of a work, where all the instances are created at once, substantially concurrently, in a one act of creation and thus all of the instances are considered as originals rather than copies.

In yet another embodiment of the invention a limiting can be performed by sequentially creating electronically or otherwise a finite quantity of electronically transferable instances of a work, where all the instances are substantially similar but distinguishable from each other by containing a serial number, a unique designator, a unique watermark, a different in sample rate, different length, or any other distinguishable variations between otherwise similar instances. Such distinguishable variations could be used for example to track each instance individually through the electronic network or for other purposes such as for example rights management, controlling distribution, identifying infringers, or other useful purposes. Additionally entire groups of instances can also be made unique from other groups for purposes such as identifying a trading market, distribution channel, set of usage rights, trading restrictions, classes of instance, classes of ownership, etc.

In this embodiment of the invention the limiting is performed based on the rights of the limiting party to perform the limiting. In other words, the limiting is empowered by exercising the at least one legal right to perform the limiting.

It shall be noticed that depending on the country, and jurisdiction, a various rights and laws may entitle a party to limit a quantity and/or exercise rights to limit a quantity of electronically transferable instances of a work. For example copyrights, which are recognized by many countries, including USA, may serve as a legal grounds to limit a quantity of a work, and may be exercised to limit quantity of instances of the work including electronically transferable instances of the work.

In some embodiments, limiting takes place and causes a limited supply of electronically transferable instances of a work available for trading in at least one market.

In yet another embodiment of the invention a limiting of the quantity of one or more usage right(s) of one or more electronically transferable instance(s) of a work is performed. The limiting of the usage right(s) is used to limit the number of times the instance(s) can be rendered, reproduced, transferred or otherwise exploited. And the limit is enforced using a rights management system such as for example a Digital Rights Management (DRM) system. However it should be obvious to one skilled in art that an other type of rights management system can be applied to enforce the limit of quantity of the usage rights. Additionally in this embodiment of the invention the limited in quantity usage right(s) are traded on a trading exchange along the electronically transferable instances of the work(s). However is shall be obvious to one skilled in art that the usage right(s) can also be traded on a separate trading exchange or not traded at all. It also shall be obvious to one skilled in art that one or more usage right(s) may be unlimited in quantity and thus not tradable on a trading exchange.

In this embodiment of the invention an informing is performed subsequently to limiting; however, the informing can also be performed at any time either sequentially or concurrently with other steps providing that the information about a result of limiting is known and can be conveyed through the process of informing. The purpose of the informing is to convey an information about at least one consequential result of the limiting to the interested party or parties, for example: trader(s), prospective trader(s), investor(s), prospective investor(s), broker(s), or any other party interested in the information. The result is considered to be consequential if a knowledge about this result can influence trading behavior(s) or pattern(s), for example results such as: a limit of quantity, a fact that limiting took place, names or titles of electronically transferable instances of a work that were the subject of limiting, scope of the limiting, target market of the limiting, initial offering price, etc., could influence trading patterns or behaviors.

For example a trader informed about the existence of the limit of quantity most likely will perceive the limited in quantity instance(s) of the work as more valuable than if the instance could be duplicated ad infinitum. The informing may also convey information about a future limiting that has been approved or authorized but which will commence in the future.

In this embodiment of the invention the informing is performed by displaying information on one or more web-pages accessible over a communication network for example: a LAN, a WAN, the Internet, etc., wherein the access to the web-page is either unrestricted and open to the general public or is restricted and limited based on predetermined criteria and available only to a one or more parties.

In the alternative embodiments of the invention the informing is accomplished for example: by electronic transfer of information over a communication network, email, mail, verbal communication, sign language, telegraph, visual signals, audible sonic signals, touch (Brail alphabet, etc.), written or printed disclosure, change in temperature, waves, broadcast (TV, radio, etc.), printing in a newspaper, etc.

In yet another embodiment of the invention the informing is performed by a computer(s) performing instructions of a program to transmit information over a communication network to a receiving computer(s) performing instructions of a program to receive the information transferred over communication network and visually display the information on a computer screen, a projection screen, an eye visor, or other visible surface(s) or a display device, etc.

In this embodiment of the invention a trading of scarce or limited in supply electronically transferable instances of the work commences subsequent to the conveying information (informing) about at least one consequential result of the limiting to the interested parties. While in this embodiment of the invention the trading of instances of a work commences subsequently to the limiting quantity of electronically transferable instances of the work and informing, in alternative embodiments of the invention trading commences before or during the limiting or before or during informing providing that the traders and other interested parties understand the potential risk(s) of the situation and therefore can factor into their decisions the element of uncertainty related to lack of information about limiting, and uncertainty about the outcome of limiting.

In this embodiment of invention the trading comprises: buying, selling, reselling, etc., of at least one instance of at least one work, however alternative embodiments of the invention can use other transactions for example: barter, short selling, portfolio trading, hedging, etc. Whenever a trading is practiced in the embodiment(s) of the present invention it shall be appreciated that said trading allows some form of reselling or other form of change of ownership of previously purchased or acquired instances of a work, or provide another way to liquidate a previously acquired portfolio of electronically transferable instances of a work for a financial or material gain or for other form of gain such as for example a fictitious or non-conventional currency, tokens, points, chips, an award, a recognition, etc.

Without such provisions trading and investing couldn't take place. In this embodiment of the invention a trading exchange stores on a computer readable medium at least one specimen of each electronically transferable instance of a work being traded on the trading exchange. The trading exchange may deliver and distribute the specimens of the instances to authorized parties such as for example buyers of said electronically transferable instances of the work(s), traders interested in evaluating said instances prior to buying, etc. However in another embodiment of the invention a trading exchange may store all issued electronically transferable instances of a work and upon delivery of each instance to a buyer or trader the trading exchange then shall delete an equivalent number of instances from its own repository thus maintaining a limit of quantity. In yet another embodiment of the invention the trading exchange does not store any instances but an authorized party associated with or independent from the trading exchange delivers instances of electronically transferable instances of works to the authorized traders and buyers.

In yet another embodiment of the invention no instances are being stored or delivered until some party requests that the instances be created, transferred, delivered or otherwise used; in said embodiment the invention is practiced mainly for the sake of trading or some form of gain rather than for the sake of consumption or utilization of the instances.

The spirit of the present invention is to establish a limited supply of electronically transferable instances of a work in at least one trading market. Even though one skilled in art can easily implement an embodiment where a trading exchange could sell not-limited-in-quantity-and-non-resalable or limited-in-quantity-non-resalable, electronically transferable instances of one or more work(s), alongside the limited in quantity or scarce, resalable electronically transferable instances the work(s); such practice may adversely affect the notion of a limited supply or scarcity of electronically transferable instances the work(s) and consequently, affect the value of the resalable instances and may be less beneficial to practicing the invention.

In this embodiment of the invention, a selling trader or an authorized party can specify a selling price for anyone or more electronically transferable instances of a work that he/she is offering for trade wherein the selling price can be set entirely arbitrarily, for example as a result of a sentiment or anticipation of some event, or information or a formula factoring a consequential events such as for example: a certain level of demand, a price spread, an level of available supply, a market sentiment, an economic indicator, etc., or any other information chosen by the selling trader or an authorized party. In an alternative embodiment of the invention the prices may be affected, controlled, or otherwise regulated by the rules of a trading exchange or a trading market, or by an individual organization or group appointed, elected or selected by one or more trading parties, or may be regulated by a group appointed by a court or a governing body or otherwise prescribed by the law.

In another embodiment of the invention a commission from one or more transaction of electronically transferrable instances of a work can be set aside as a compensation for the author of the work or any other a party having direct or indirect interest in the work or instances of the work. Said commission can be fixed as a fixed amount or fixed percentage or dynamically changing based on a set of one or more arbitrary criteria such as for example: percentage of valuable consideration involved in the transaction, a percentage of price change between a transactions, a function of a sales volume, a function of market demand, a function of a future sales forecast, or any other single or multiple arbitrary criteria.

In one embodiment of the invention a limited trading can take place prior to general trading, wherein the general trading may be delayed for a period of time. The object of the limited trading is to allow a one or more parties such as for example an issuer(s), owner(s), creator(s), etc., of electronically transferable instances of works to gain an advantage such as for example being able to capitalize on certain releases of electronically transferable instances of a work without competition, and allow the party(s) to be the only seller of some electronically transferable instances of a work for a period of time after which a general trading would commence where other sellers would be permitted to sell said some electronically transferable instances of work. However it shall be appreciated that any step of any of the embodiment of the present invention is meant to be practiced lawfully within the laws governing the application of the present invention.

In this embodiment of the invention the trading is performed on a fully or partially computerized trading exchange which is capable of conducting electronic transactions including but not limited to Internet transactions. However the trading of electronically transferable instances of works can be practiced outside of a trading exchange for example: a person to person private transaction, through a human brokers or intermediaries, through a physical or electronic stores or auction, within a group of members of investment club, etc.

In an alternative embodiment of the invention a trading exchange tracks all the transactions and the number of instances of a work in circulation and enforces at least part of the rights of the owners, issuers, and traders, etc. The trading exchange can also provide accounting, quote service and other services to its members and users. Traders can access their accounts, initiate trades, monitor status of their account, check the funds in the account etc. Qualified traders can also have the access to margin loans, short selling, options and other forms of transfer of equity or ownership, etc.

In yet another embodiment of invention a trading exchange may take active position as a trader and engage in buying, selling, reselling, trading, optioning, hedging, shorting, etc., of electronically transferable instances of works from its own trading account. In such as case the trading exchange would act somehow similar to any other trader having its own trading account and its own portfolio of items for trade. Of course fairness and vigilance would have to be exercised because the trading exchange is normally a guardian of sensitive data that could potentially be used to treat its own trades in a preferential manner which could be detrimental to the confidence of other traders. Such activity could however be also used in a positive and fair way to for example stabilize certain issues of electronically transferable instances of works and to engage in market-maker activities.

In this embodiment of the invention a transfer of an ownership, one or more electronically transferable instances of one or more works is conducted electronically over a communication network. The transfer is conducted electronically and a record of the transfer is stored on a computer readable medium. However in another embodiment of the invention such transfer of ownership may be conducted otherwise such as for example in person, through a human agent or broker, through a vending machine, etc. and optionally recorded on, a computer medium, on paper, or certified by a issuing a physical, electronic, or virtual document attesting the transfer, etc. Similarly a transfer of right(s) to use or exploit an electronically transferable instance(s) of a work(s) can take place over a communication network or otherwise, such as for example in person, through an agent, vending machine, etc.

In this embodiment of the invention a trading exchange in addition to trading scarce or limited in supply electronically transferable instance(s) of a work can also trade scarce or limited in supply usage right(s) of a work. It shall be however understood that trading of the instance(s) and trading of the usage right(s) may also be accomplished on separate trading exchanges where one trading exchange trades the instance(s) of works and another trading exchange trades the usage right(s).

However the trading is performed the salient point in some embodiments is that the trading takes place and results in a change of ownership of at least one scarce or limited in supply electronically transferable instance(s) of a work and/or at least one usage right of a work.

In another embodiment of the invention the steps of: exercising the at least one right to limit a quantity of electronically transferrable instance(s) of work(s); limiting the quantity of electronically transferrable instance(s) of a work(s); conveying information about at least one consequential aspect of limiting; trading on a trading exchange at least a part of the limited supply of electronically transferrable instance(s) of work(s); said steps are implemented in form of a computer program stored on a computer readable medium and executed by a computer wherein the communication between the user and the program is carried over a communication network such as for example the Internet, LAN, WAN, etc., The steps described herein are executed sequentially however anyone or more of the said steps can be executed concurrently as long as the program performing the steps is provided with the necessary input data to perform the said steps.

In yet another embodiment of the invention a trading exchange may provide to a trader and/or any other interested party one or more evaluation instance(s) of a work(s) being traded on the trading exchange. The evaluation instance(s) may comprise for example a partial of a full: song, video, electronic image, document, drawing, etc. The trader(s) who desire to test, try, experience, perceive, reproduce, or render an instance of a work may be provided an option to render or otherwise use, at least a part of the instance of the work. The rendering may be performed as listening, viewing, reading, executing or otherwise using at least a part of at least one instance of the work and may provide the trader with information about the instance of the work. The rendering of Instances of the work can be facilitated by the trading exchange engaged in trading the instances of the work wherein the trading exchange streams, offers for download, mails, transfers, transmits, delivers, broadcasts or otherwise provides either electronic or non electronic instance of the work to the trader for his/her/its use and/or consumption. It should be understood that the rendering may be also facilitated by any other party either associated or not associated with the trading exchange or may be initiated and performed by the trader without any participation of the trading exchange. The rendering may be a result of an electronic transfer of at least part of at least one Instance of the work and/or as a result of physical contact with the instance of the work such as for example: touching, tasting, viewing and/or through other use of the instance of the work. The rendering can be provided free of charge or for a fee and may also be treated as a trade if at least a part of an instance of the work is exchanged for valuable consideration.

In yet another embodiment of the invention a full or partial evaluation instance(s) for rendering are provided by a party that is separate and different from the trading exchange. Such party may be an individual, a company, a service provider, a public entity, etc. that has a repository of the evaluation instance(s) and provides them for a fee or free of charge or the basis of barter or based on other factors. Furthermore the rendering is optional and can be omitted altogether.

In an alternative embodiment of the invention an issuer of limited in quantity electronically transferable instances of a work, after authorizing the instances for trading on a trading exchange, can authorize issue of additional instances in excess of the originally established limit of quantity. In such a case the existing owners of the electronically transferable instances of the work would receive additional instances to compensate them for a potential loss of value or dilution of their portfolio due to an increased supply. Additionally an issuer may authorize a reduction of quantity of instances which would result in a quantity lesser then the originally established. In such a case the existing owners of the electronically transferable instances of the work could be enticed or forced to relinquish or give up ownership of certain quantity of the instances in exchange for increased value per instance or for another form of compensation. The above described activity of increasing or reducing the supply and consequently affecting its value and that of a remaining supply of tradable instances can be compared to an activity that takes place on most stock exchanges, which is known as stock splits and reversed stock splits etc.

In yet another embodiment of the invention a one or more rights to one or more works may be acquired by the trading exchange, wherein at least some of the acquired right(s) empower the owner of the right(s) to limit quantity of electronically transferable instances of one or more works and sell the electronically transferable instances of work(s)

in a trading market or exploit acquired work(s) and/or electronically transferable instances of acquired work(s) in accordance with a method described herein above, or exploit otherwise.

In an alternative embodiment of the invention any arbitrary party that is not an author or an owner of a work may acquire a one or more right(s) to the work, wherein at least some of the acquired rights empower the party to limit a quantity of electronically transferable instances of the work and sell an electronically transferable instances of the work in a trading market or exploit the work or electronically transferable instances of the work in accordance with any steps herein.

In yet another embodiment of the invention a one or more works may be created by a party or creation may be commissioned by a party in order to make, provide a one or more electronically transferable instances of the created work(s) for trading on a trading exchange or otherwise exploit created work(s) or electronically transferable instances of the work(s) in accordance with a method described in this document or exploit otherwise.

In another embodiment of the invention an online computer system is used to provide trading services to remote users interacting with the computer system over a communication network such as for example the Internet. The computer system assists the users in performing the steps of the method described herein in this patent application, by providing interactive step by step instructions and the necessary forms to perform each step of the method as described herein in this patent application. The computer system assists the remoter users in exercising one or more rights to limit quantity of electronically transferrable instances of at least one work. The computer system assists the remote users in limiting a quantity of the electronically transferable instances of the work(s). The computer system causes limited supply of said electronically transferable instances of the work(s) to be available for trading on an electronic trading exchange. The computer system sends (conveys) over the internet information about at least one consequential result of the limiting to at least one party interested in trading of at least a part of the limited supply of the electronically transferable instances of the work(s). The computer system performs an electronic trading of at least a part of the limited supply of the electronically transferrable instances of the work(s) thus acting as an electronic trading exchange where selling, buying, and re-selling are a permitted transactions.

It shall be obvious to one skilled in art that the present invention may be used in a manner described by the embodiments herein to exploit instance(s) of existing copyrighted work(s) as well as work(s) that will be created and copyrighted in the future.

It also shell be also obvious to one skilled in art that several instances of several works as well as one or more instances of a single work can be a subject of exercising rights to limit quantity, limiting quantity, trading, informing, sampling, and other acts, steps, methods and systems, etc. as described herein.

Additionally in some jurisdictions and in some cases it may be possible and legal to pre-sell non-existing instance(s) of a work that has not been yet created in a way similar to pre selling condominiums that have not yet been build. In those cases the invention may be practiced as well except the trading step will involve trading virtual instances of a one or more non-existing work. The virtual instances are just a form of symbolic ownership of a future work, such as for example a receipt stating that a holder of the receipt is an owner of an instance a work that will be created in the future. The symbolic ownership can also be represented by any other digital or physical element such as for example an entry in the database, a certificate of ownership, physical or digital token or another symbolic representation where the value of the symbolic representation is a reflection of an arbitrary value buyers and sellers assign to said virtual representation.

The steps of method 200 may be performed by a computer program product embodied on a computer readable medium.

Figure 3:
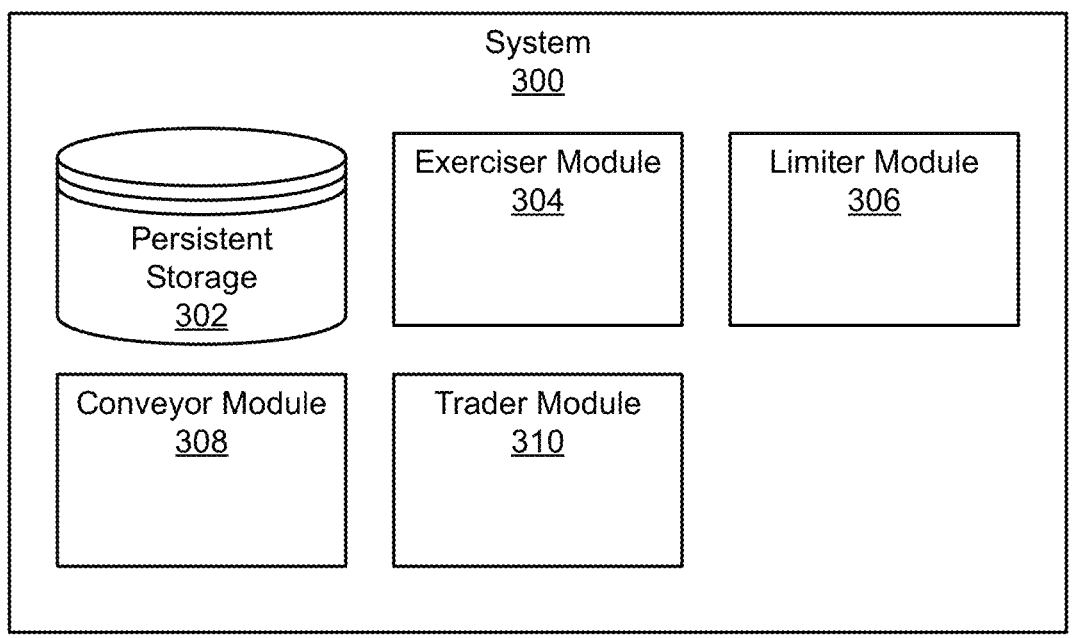
FIG. 3 is a block diagram illustrating one system for maintaining scarcity of instances of works in accordance with the present invention.

FIG. 3 is a block diagram illustrating one system for maintaining scarcity of an instance of a work in accordance with the present invention. The system 300 comprises a persistent storage 302, an exerciser module 304, a limiter module 306, a conveyor module 308, and a trader module 310.

The modules of the system 300 each are respectively configured to perform one of the steps of the method 200 above, and the modules are namesaked on the steps of the method 200 which they perform.

Figure 4:
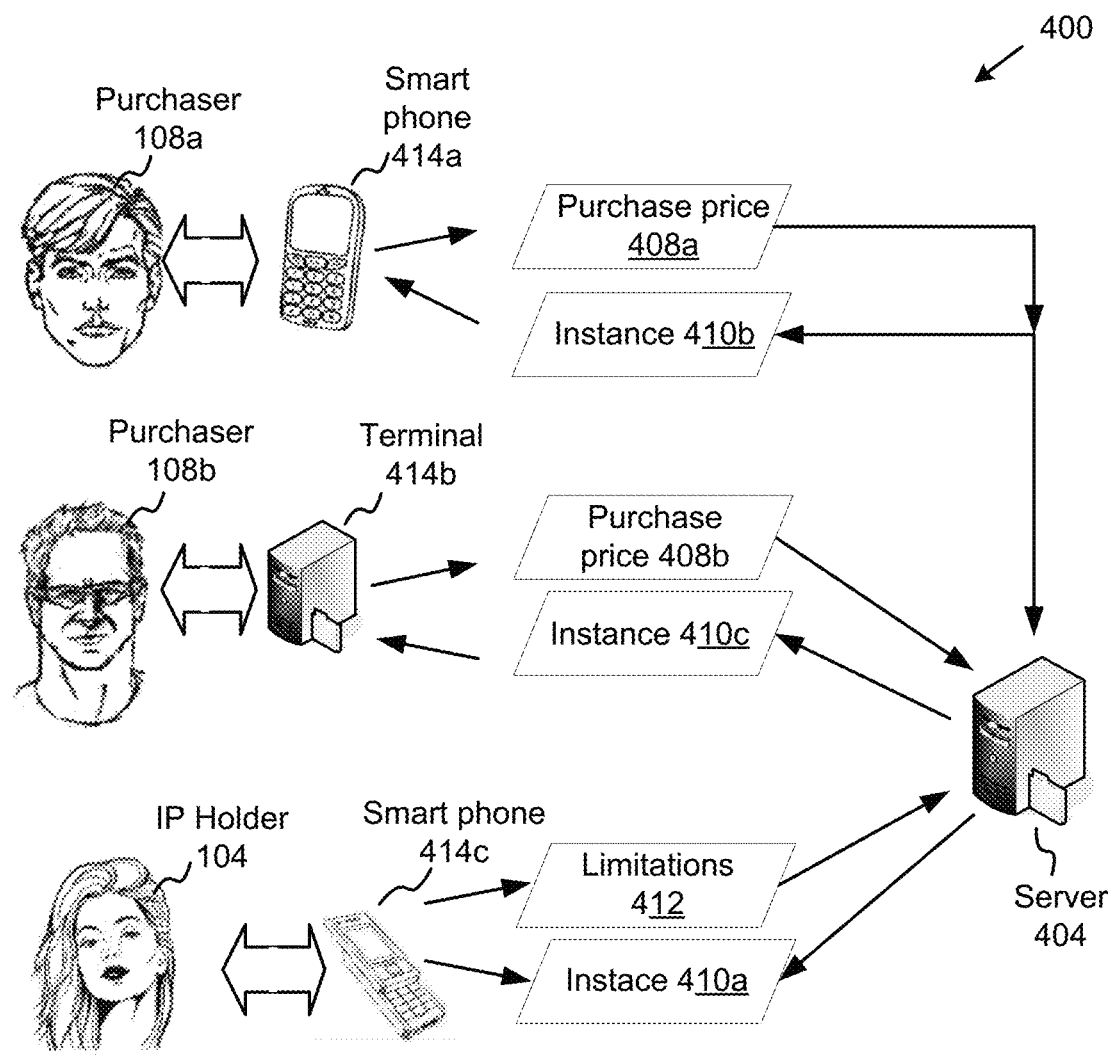
FIG. 4 is an entity-relationship diagram illustrating the relationship between entities working in concert to maintain scarcity of instances of works in accordance with the present invention.

FIG. 4 is an entity-relationship diagram illustrating the relationship between entities working in concert to maintain scarcity of an instance of works in accordance with the present invention. The system 400 comprises purchasers 108*a-b*, a server 404, purchase prices 408*a-b*, instances 410*a-c*, limitations 412, a smart phone 414*a*, a terminal 414*b*, and smart phone 414*c*.

In the shown embodiment, the smart phones and terminals 414*a-c* may comprise personal computers, workstations, or smart cellular phones as shown.

The purchasers 108*a-b* may remit a purchase price 408*a-b* to the server 404 or another third-party, which server 404 hosts a trading platform 102 interacting with the purchasers 108*a-b*. The purchase price 408*a-b* may be remitted via any means well-known to those of skill in the art, including credit card, PayPal, eCheck, bank transfer, and the like.

The IP Holder 104, after creating an account, specifies limitations 412 which will be applied to the sale of instances of the works. These limitations are substantially described above in relation to the previous figures and steps of the method 200.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for trading of a transformed electronically transferable instance(s) of a work(s), the method comprising:

transforming an electronically transferable instance(s) of the work(s) into a tradable electronically transferable instance(s) of the work(s) wherein the transforming comprises:

exercising a legal right(s) to limit a quantity of the electronically transferable instance(s) of the work(s);

limiting the quantity of the electronically transferable instance(s) of the work(s), wherein the limiting is empowered at least in part by the exercising of the legal right(s), and causes a limited supply of the electronically transferable instance(s) of the work(s);

granting a right(s) to resale at least a part of the limited supply of the electronically transferable instance(s) of the work(s) to a party(s), wherein the right(s) to resale is expressly granted by, or under authority of, a copyright owner(s) of the work(s);

conveying information about a consequential result(s) of the limiting to a party(s);

trading over a communication network, at least a part of the transformed electronically transferable instance(s) of the work(s), wherein the trading comprises one or more of: selling, buying, reselling, barter, short selling.

2. The method of claim 1, wherein the transforming further comprises:

enforcing one or more of: a usage right to the electronically transferable instance(s) of the work(s), a property of the electronically transferable instance(s) of the work(s), wherein the enforcing is performed by at least one of: a rights management system, a computer under control of a program, an electronic hardware.

3. The method of claim 1, further comprising:

embodying at least a part of the work(s) in a tangible medium(s) of expression wherein the embodied the at least the part of the work(s) can be at least one of: rendered, expressed, read, perceived, reproduced, or otherwise communicated for a period of more than transitory duration.

4. The method of claim 1, further comprising at least one of:

transmitting the electronically transferable instance(s) of the work(s) over a communication network from a first location to a second location, transmitting the transformed electronically transferable instance(s) of the work(s) over a communication network from a first location to a second location, reproducing the electronically transferable instance(s) of the work(s), rendering the electronically transferable instance(s) of the work(s), performing the electronically transferable instances) of the work(s), storing the electronically transferable instance(s) of the work(s), reproducing the transformed electronically transferable instance(s) of the work(s), rendering the transformed electronically transferable instance(s) of the work(s), performing the transformed electronically transferable instance(s) of the work(s), storing the transformed electronically transferable instance(s) of the work(s).

5. The method of claim 1, further comprising:

enforcing a limit of the quantity resulting from the limiting, wherein the enforcing comprises at least one of: creating a number of the electronically transferable instance(s) of the work(s), deleting a number of the electronically transferable instance(s) of the work(s), adding a number of the electronically transferable instance(s) of the work(s), maintaining constant a number of the electronically transferable instance(s) of the work(s), tracking a number of the electronically transferable instance(s) of the work(s).

6. The method of claim 1, wherein at least one step of the method is performed by an online computer(s) or with an assistance of an online computer(s).

7. The method of claim 1, wherein the limiting is performed by at least one of the following means for limiting: mechanical means, magnetic means, radio-active means, pneumatic means, hydraulic means, chemical means, optical means, electronic means, electric means.

8. The method of claim 1, wherein the limiting produces a limit of quantity that is dynamically changing based on a consequential event(s).

9. The method of claim 1, wherein the trading is performed on a computerized trading exchange(s).

10. The method of claim 1 further comprising at least one of the following steps: a step of storing at least a part of data resulting from performing the method of claim 1 on a computer readable medium, a step of outputting in a human readable format at least part of data resulting from performing the method of claim 1.

11. A method for trading of a transformed usage right(s) to an electronically transferable instance(s) of a work(s), the method comprising:

transforming a usage right(s) to the electronically transferable instance(s) of the work(s) into a tradable usage right(s) to the electronically transferable instance(s) of the work(s), wherein the transforming comprises:

exercising a legal right(s) to limit a quantity of the usage right(s) to the electronically transferable instance(s) of the work(s);

limiting the quantity of the usage right(s) to the electronically transferable instance(s) of the work(s), wherein the limiting is empowered at least in part by the exercising of the legal right(s), and causes a limited supply of the usage right(s) to the electronically transferable instance(s) of the work(s);

granting a right(s) to resale at least a part of the limited supply of the usage right(s) to the electronically transferable instance(s) of the work(s) to a party(s), wherein the right(s) to resale is expressly granted by, or under authority of, a copyright owner(s) of the work(s);

conveying information about a consequential result(s) of the limiting to a party(s);

trading over a communication network, at least a part of the transformed usage right(s) to the electronically transferable instance(s) of the work(s), wherein the trading comprises one or more of: selling, buying, reselling, barter, short selling.

12. The method of claim 11, wherein the transforming further comprises:

enforcing one or more of: the usage right(s) to the electronically transferable instance(s) of the work(s), the limit of quantity of the usage right(s) to the electronically transferable instance(s) of the work(s), wherein the enforcing is performed by at least one of: a rights management system, a computer under control of a program, an electronic hardware.

13. The method of claim 11, further comprising:

embodying at least a part of the work(s) in a tangible medium(s) of expression wherein the embodied the at least the part of the work(s) can be at least one of: rendered, expressed, read, perceived, reproduced, or otherwise communicated for a period of more than transitory duration.

14. The method of claim 11, further comprising at least one of:

transmitting the electronically transferable instance(s) of the work(s) over a communication network from a first location to a second location, reproducing the electronically transferable instance(s) of the work(s), rendering the electronically transferable instance(s) of the work(s), performing the electronically transferable instance(s) of the work(s), storing the electronically transferable instance(s) of the work(s).

15. The method of claim 11, wherein at least one step of the method is performed by an online computer(s) or with an assistance of an online computer(s).

16. The method of claim 11, wherein the trading is performed on a computerized trading exchange(s).

17. The method of claim 11, wherein the limiting produces a limit of quantity that is dynamically changing based on a consequential event(s).

18. A method for trading of a transformed usage right(s) to a not yet created electronically transferable instance(s) of a work(s) the method comprising:
transforming a usage right(s) to the not yet created electronically transferable instance(s) of the work(s) into a tradable usage right(s) to the not yet created electronically transferable instance(s) of the work(s), wherein the transforming comprises:
exercising a legal right(s) to limit a quantity of the usage right(s) to the not yet created electronically transferable instance(s) of the work(s);
limiting the quantity of the usage right(s) to the not yet created electronically transferable instance(s) of the work(s), wherein the limiting is empowered at least in part by the exercising of the legal right(s), and causes a limited supply of the usage right(s) to the not yet created electronically transferable instance(s) of the work(s);
granting a right(s) to resale at least a part of the limited supply of the usage right(s) to the not yet created electronically transferable instance(s) of the work(s) to a party(s), wherein the right(s) to resale is expressly granted by, or under authority of, a copyright owner(s) of the work(s);
conveying information about a consequential result(s) of the limiting to a party(s);
trading over a communication network, at least a part of the transformed usage right(s) to the not yet created electronically transferable instance(s) of the work(s), wherein the trading comprises one or more of: selling, buying, reselling, barter, short selling.

19. The method of claim 18, wherein the limiting produces a limit of quantity that is dynamically changing based on a consequential event(s).

20. A computer system comprising at least one computer, the computer system programmed to perform at least one of the following three methods:
(i) a method for trading of a transformed electronically transferable instance(s) of a work(s), the method comprising:
transforming an electronically transferable instance(s) of the work(s) into a tradable electronically transferable instance(s) of the work(s) wherein the transforming comprises:
exercising a legal right(s) to limit a quantity of the electronically transferable instance(s) of the work(s);
limiting the quantity of the electronically transferable instance(s) of the work(s), wherein the limiting is empowered at least in part by the exercising of the legal right(s), and causes a limited supply of the electronically transferable instance(s) of the work(s);
granting a right(s) to resale at least a part of the limited supply of the electronically transferable instance(s) of the work(s) to a party(s), wherein the right (s) to resale is expressly granted by, or under authority of, a copyright owner(s) of the work(s);
conveying information about a consequential result(s) of the limiting to a party(s);
trading over a communication network, at least a part of the transformed electronically transferable instance(s) of the work(s), wherein the trading comprises one or more of: selling, buying, reselling, barter, short selling,
(ii) a method for trading of a transformed usage right(s) to an electronically transferable instance(s) of a work(s), the method comprising:
transforming a usage right(s) to the electronically transferable instance(s) of the work(s) into a tradable usage right(s) to the electronically transferable instance(s) of the work(s), wherein the transforming comprises:
exercising a legal right(s) to limit a quantity of the usage right(s) to the electronically transferable instance(s) of the work(s);
limiting the quantity of the usage right(s) to the electronically transferable instance(s) of the work(s), wherein the limiting is empowered at least in part by the exercising of the legal right(s), and causes a limited supply of the usage right(s) to the electronically transferable instance(s) of the work(s);
granting a right(s) to resale at least a part of the limited supply of the usage right(s) to the electronically transferable instance(s) of the work(s) to a party(s), wherein the right(s) to resale is expressly granted by, or under authority of, a copyright owner(s) of the work(s);
conveying information about a consequential result(s) of the limiting to a party(s);
trading over a communication network, at least a part of the transformed usage right(s) to the electronically transferable instance(s) of the work(s), wherein the trading comprises one or more of: selling, buying, reselling, barter, short selling,
(iii) a method for trading of a transformed usage right(s) to a not yet created electronically transferable instance(s) of a work(s) the method comprising:
transforming a usage right(s) to the not yet created electronically transferable instance(s) of the work(s) into a tradable usage right(s) to the not yet created electronically transferable instance(s) of the work(s), wherein the transforming comprises:
exercising a legal right(s) to limit a quantity of the usage right(s) to the not yet created electronically transferable instance(s) of the work(s);
limiting the quantity of the usage right(s) to the not yet created electronically transferable instance(s) of the work(s), wherein the limiting is empowered at least in part by the exercising of the legal right(s), and causes a limited supply of the usage right(s) to the not yet created electronically transferable instance(s) of the work(s);
granting a right(s) to resale at least a part of the limited supply of the usage right(s) to the not yet created electronically transferable instance(s) of the work(s) to a party(s), wherein the right(s) to resale is expressly granted by, or under authority of, a copyright owner(s) of the work(s);
conveying information about a consequential result(s) of the limiting to a party(s);
trading over a communication network, at least a part of the transformed usage right(s) to the not yet created electronically transferable instance(s) of the work(s), wherein the trading comprises one or more of: selling, buying, reselling, barter, short selling.

21. A computer program product, comprising:
a non-transitory computer readable medium having stored therein a computer program which when executed causes a computer to perform at least one of the following three methods:
(i) a method for trading of a transformed electronically transferable instance(s) of a work(s), the method comprising:
  transforming an electronically transferable instance(s) of the work(s) into a tradable electronically transferable instance(s) of the work(s) wherein the transforming comprises:
    exercising a legal right(s) to limit a quantity of the electronically transferable instance(s) of the work(s);
    limiting the quantity of the electronically transferable instance(s) of the work(s), wherein the limiting is empowered at least in part by the exercising of the legal right(s), and causes a limited supply of the electronically transferable instance(s) of the work(s);
    granting a right(s) to resale at least a part of the limited supply of the electronically transferable instance(s) of the work(s) to a party(s), wherein the right(s) to resale is expressly granted by, or under authority of, a copyright owner(s) of the work(s);
    conveying information about a consequential result(s) of the limiting to a party(s);
  trading over a communication network, at least a part of the transformed electronically transferable instance(s) of the work(s), wherein the trading comprises one or more of: selling, buying, reselling, barter, short selling,
(ii) a method for trading of a transformed usage right(s) to an electronically transferable instance(s) of a work(s), the method comprising:
  transforming a usage right(s) to the electronically transferable instance(s) of the work(s) into a tradable usage right(s) to the electronically transferable instance(s) of the work(s), wherein the transforming comprises:
    exercising a legal right(s) to limit a quantity of the usage right(s) to the electronically transferable instance(s) of the work(s);
    limiting the quantity of the usage right(s) to the electronically transferable instance(s) of the work(s), wherein the limiting is empowered at least in part by the exercising of the legal right(s), and causes a limited supply of the usage right(s) to the electronically transferable instance(s) of the work(s);
    granting a right(s) to resale at least a part of the limited supply of the usage right(s) to the electronically transferable instance(s) of the work(s) to a party(s), wherein the right(s) to resale is expressly granted by, or under authority of, a copyright owner(s) of the work(s);
    conveying information about a consequential result(s) of the limiting to a party(s);
  trading over a communication network, at least a part of the transformed usage right(s) to the electronically transferable instance(s) of the work(s), wherein the trading comprises one or more of: selling, buying, reselling, barter, short selling,
(iii) a method for trading of a transformed usage right(s) to a not yet created electronically transferable instance(s) of a work(s) the method comprising:
  transforming a usage right(s) to the not yet created electronically transferable instance(s) of the work(s) into a tradable usage right(s) to the not yet created electronically transferable instance(s) of the work(s), wherein the transforming comprises:
    exercising a legal right(s) to limit a quantity of the usage right(s) to the not yet created electronically transferable instance(s) of the work(s);
    limiting the quantity of the usage right(s) to the not yet created electronically transferable instance(s) of the work(s), wherein the limiting is empowered at least in part by the exercising of the legal right(s), and causes a limited supply of the usage right(s) to the not yet created electronically transferable instance(s) of the work(s);
    granting a right(s) to resale at least a part of the limited supply of the usage right(s) to the not yet created electronically transferable instance(s) of the work(s) to a party(s), wherein the right(s) to resale is expressly granted by, or under authority of, a copyright owner(s) of the work(s);
    conveying information about a consequential result(s) of the limiting to a party(s);
  trading over a communication network, at least a part of the transformed usage right(s) to the not yet created electronically transferable instance(s) of the work(s), wherein the trading comprises one or more of: selling, buying, reselling, barter, short selling.

22. A computer system comprising at least one computer, the computer system programmed to assist in performing at least one of the following three methods:
(i) a method for trading of a transformed electronically transferable instance(s) of a work(s), the method comprising:
  transforming an electronically transferable instance(s) of the work(s) into a tradable electronically transferable instance(s) of the work(s) wherein the transforming comprises:
    exercising a legal right(s) to limit a quantity of the electronically transferable instance(s) of the work(s);
    limiting the quantity of the electronically transferable instance(s) of the work(s), wherein the limiting is empowered at least in part by the exercising of the legal right(s), and causes a limited supply of the electronically transferable instance(s) of the work(s);
    granting a right(s) to resale at least a part of the limited supply of the electronically transferable instance(s) of the work(s) to a party(s), wherein the right(s) to resale is expressly granted by, or under authority of, a copyright owner(s) of the work(s);
    conveying information about a consequential result(s) of the limiting to a party(s);
  trading over a communication network, at least a part of the transformed electronically transferable instance(s) of the work(s), wherein the trading comprises one or more of: selling, buying, reselling, barter, short selling,
(ii) a method for trading of a transformed usage right(s) to an electronically transferable instance(s) of a work(s), the method comprising:

transforming a usage right(s) to the electronically transferable instance(s) of the work(s) into a tradable usage right(s) to the electronically transferable instance(s) of the work(s), wherein the transforming comprises:
   exercising a legal right(s) to limit a quantity of the usage right(s) to the electronically transferable instance(s) of the work(s):
   limiting the quantity of the usage right(s) to the electronically transferable instance(s) of the work(s), wherein the limiting is empowered at least in part by the exercising of the legal right(s), and causes a limited supply of the usage right(s) to the electronically transferable instance(s) of the work(s);
   granting a right(s) to resale at least a part of the limited supply of the usage right(s) to the electronically transferable instance(s) of the work(s) to a party(s), wherein the right(s) to resale is expressly granted by, or under authority of, a copyright owner(s) of the work(s);
   conveying information about a consequential result(s) of the limiting to a party(s);
trading over a communication network, at least a part of the transformed usage right(s) to the electronically transferable instance(s) of the work(s), wherein the trading comprises one or more of: selling, buying, reselling, barter, short selling,
(iii) a method for trading of a transformed usage right(s) to a not yet created electronically transferable instance(s) of a work(s) the method comprising:
transforming a usage right(s) to the not yet created electronically transferable instance(s) of the work(s) into a tradable usage right(s) to the not yet created electronically transferable instance(s) of the work(s), wherein the transforming comprises:
   exercising a legal right(s) to limit a quantity of the usage right(s) to the not yet created electronically transferable instance(s) of the work(s);
   limiting the quantity of the usage right(s) to the not yet created electronically transferable instance(s) of the work(s), wherein the limiting is empowered at least in part by the exercising of the legal right(s), and causes a limited supply of the usage right(s) to the not yet created electronically transferable instance(s) of the work(s);
   granting a right(s) to resale at least a part of the limited supply of the usage right(s) to the not yet created electronically transferable instance(s) of the work(s) to a party(s), wherein the right(s) to resale is expressly granted by, or under authority of, a copyright owner(s) of the work(s);
   conveying information about a consequential result(s) of the limiting to a party(s);
trading over a communication network, at least a part of the transformed usage right(s) to the not yet created electronically transferable instance(s) of the work(s), wherein the trading comprises one or more of: selling, buying, reselling, barter, short selling.

\* \* \* \* \*